(12) United States Patent
Arbuckle et al.

(10) Patent No.: US 9,377,780 B1
(45) Date of Patent: Jun. 28, 2016

(54) SYSTEMS AND METHODS FOR DETERMINING A HEADING VALUE OF A MARINE VESSEL

(71) Applicant: Brunswick Corporation, Lake Forest, IL (US)

(72) Inventors: Jason S. Arbuckle, Horicon, WI (US); Matthew W. Snyder, Fond du Lac, WI (US); Thomas S. Kirchhoff, Fond du Lac, WI (US)

(73) Assignee: Brunswick Corporation, Lake Forest, IL (US)

(*) Notice: Subject to any disclaimer, the term of this patent is extended or adjusted under 35 U.S.C. 154(b) by 14 days.

(21) Appl. No.: 14/200,831

(22) Filed: Mar. 7, 2014

Related U.S. Application Data

(60) Provisional application No. 61/781,970, filed on Mar. 14, 2013.

(51) Int. Cl.
*G05D 1/00* (2006.01)
*G01C 21/20* (2006.01)
*G05D 1/08* (2006.01)
*G01C 21/08* (2006.01)
*B63H 1/00* (2006.01)

(52) U.S. Cl.
CPC *G05D 1/00* (2013.01); *G01C 21/08* (2013.01); *G01C 21/20* (2013.01); *G05D 1/08* (2013.01); *B63H 1/00* (2013.01)

(58) Field of Classification Search
CPC .......... G05D 1/00; G05D 1/08; G01C 21/08; G01C 21/20; B63H 1/00
See application file for complete search history.

(56) References Cited

U.S. PATENT DOCUMENTS

| | | | | |
|---|---|---|---|---|
| 4,692,868 | A | * | 9/1987 | Wesner ................ G05D 1/0005 318/588 |
| 4,811,679 | A | * | 3/1989 | Masuzawa ........... G05D 1/0206 114/144 RE |
| 5,172,324 | A | * | 12/1992 | Knight ............................ 701/21 |
| 5,202,835 | A | | 4/1993 | Knight |
| 5,331,558 | A | | 7/1994 | Hossfield et al. |
| 5,362,263 | A | | 11/1994 | Petty |
| 5,386,368 | A | | 1/1995 | Knight |

(Continued)

FOREIGN PATENT DOCUMENTS

WO   WO 2012009758 A1 *  1/2012

OTHER PUBLICATIONS

Wikipedia.org, "Course (navigation)", Accessed on Nov. 14, 2015. Archived by archive.org on Mar. 21, 2012.*

(Continued)

*Primary Examiner* — John R Olszewski
*Assistant Examiner* — Jeffrey Boomer
(74) *Attorney, Agent, or Firm* — Andrus Intellectual Property Law, LLP

(57) ABSTRACT

A method for determining a heading value of a marine vessel includes determining a first estimate of a direction of the marine vessel based on information from a first source and determining a second estimate of a direction of the marine vessel based on information from a second source. The method includes inputting the first estimate and the second estimate to a control circuit, which scales each of the first estimate and the second estimate and adds the scaled estimates together so as to determine the heading value. A system for determining a heading value of a marine vessel is also disclosed.

18 Claims, 5 Drawing Sheets

(56) References Cited

U.S. PATENT DOCUMENTS

| | | | |
|---|---|---|---|
| 5,390,118 A * | 2/1995 | Margolis | B62D 1/28 |
| | | | 180/168 |
| 5,491,636 A | 2/1996 | Robertson et al. | |
| 5,676,334 A * | 10/1997 | Cotton | G05D 1/0816 |
| | | | 244/12.2 |
| 5,736,962 A | 4/1998 | Tendler | |
| 5,884,213 A * | 3/1999 | Carlson | 701/21 |
| 5,951,607 A * | 9/1999 | Senn | G05D 1/0206 |
| | | | 244/194 |
| 6,059,226 A | 5/2000 | Cotton et al. | |
| 6,076,024 A * | 6/2000 | Thornberg | G05D 1/0858 |
| | | | 244/17.13 |
| 6,092,007 A | 7/2000 | Cotton et al. | |
| 6,230,642 B1 | 5/2001 | McKenney et al. | |
| 6,273,771 B1 * | 8/2001 | Buckley et al. | 440/84 |
| 6,308,651 B2 | 10/2001 | McKenney et al. | |
| 6,366,856 B1 * | 4/2002 | Johnson | G01C 17/28 |
| | | | 701/454 |
| 6,377,889 B1 | 4/2002 | Soest | |
| 6,446,003 B1 * | 9/2002 | Green | G01C 21/20 |
| | | | 342/357.3 |
| 6,469,664 B1 * | 10/2002 | Michaelson | B63B 43/18 |
| | | | 342/357.31 |
| 6,485,341 B1 | 11/2002 | Lanyi et al. | |
| 6,604,479 B2 | 8/2003 | McKenney et al. | |
| 6,611,755 B1 * | 8/2003 | Coffee et al. | 701/482 |
| 6,678,589 B2 | 1/2004 | Robertson | |
| 6,995,527 B2 | 2/2006 | DePasqua | |
| 7,267,068 B2 | 9/2007 | Bradley et al. | |
| 7,305,928 B2 | 12/2007 | Bradley et al. | |
| 7,366,593 B2 * | 4/2008 | Fujimoto et al. | 701/21 |
| 7,416,458 B2 | 8/2008 | Suemori et al. | |
| 7,476,134 B1 | 1/2009 | Fell et al. | |
| 7,577,526 B2 | 8/2009 | Kim et al. | |
| 8,050,630 B1 | 11/2011 | Arbuckle | |
| 8,145,371 B2 | 3/2012 | Rae et al. | |
| 8,155,811 B2 | 4/2012 | Noffsinger et al. | |
| 8,165,806 B2 * | 4/2012 | Yasan et al. | 701/472 |
| 8,478,464 B2 | 7/2013 | Arbuckle et al. | |
| 8,694,248 B1 * | 4/2014 | Arbuckle et al. | 701/468 |
| 9,248,898 B1 * | 2/2016 | Kirchhoff | B63H 21/213 |
| 2003/0212478 A1 * | 11/2003 | Rios | G05D 1/0094 |
| | | | 701/2 |
| 2004/0020064 A1 * | 2/2004 | Levi et al. | 33/319 |
| 2004/0221787 A1 | 11/2004 | McKenney et al. | |
| 2004/0267450 A1 * | 12/2004 | Kernwein | 701/213 |
| 2005/0170713 A1 | 8/2005 | Okuyama | |
| 2006/0278152 A1 * | 12/2006 | Nickerson | B63H 25/14 |
| | | | 114/144 R |
| 2007/0032923 A1 * | 2/2007 | Mossman et al. | 701/4 |
| 2007/0037582 A1 * | 2/2007 | Mohi | G01C 21/20 |
| | | | 455/456.1 |
| 2007/0089660 A1 | 4/2007 | Bradley et al. | |
| 2010/0023192 A1 * | 1/2010 | Rae et al. | 701/21 |
| 2011/0153126 A1 * | 6/2011 | Arbuckle et al. | 701/21 |
| 2012/0059577 A1 * | 3/2012 | Dunkle | G01C 21/20 |
| | | | 701/411 |
| 2012/0248259 A1 | 10/2012 | Page et al. | |
| 2012/0303203 A1 * | 11/2012 | Olsen | G08G 1/0133 |
| | | | 701/29.1 |
| 2013/0024072 A1 * | 1/2013 | Michelis | B62D 15/0235 |
| | | | 701/42 |
| 2013/0124047 A1 * | 5/2013 | Lazic | B62D 15/025 |
| | | | 701/42 |
| 2013/0173096 A1 * | 7/2013 | Chalhoub | G05D 1/0206 |
| | | | 701/21 |
| 2013/0211716 A1 * | 8/2013 | Kellar | 701/472 |
| 2013/0261856 A1 * | 10/2013 | Sharma | B61L 25/025 |
| | | | 701/19 |
| 2014/0005928 A1 * | 1/2014 | Giannetta | G01S 19/49 |
| | | | 701/431 |
| 2014/0244081 A1 * | 8/2014 | Ueno | B63H 25/04 |
| | | | 701/21 |
| 2014/0309888 A1 * | 10/2014 | Smit et al. | 701/41 |

OTHER PUBLICATIONS

U.S. Appl. No. 13/787,108, filed Mar. 6, 2013.
U.S. Appl. No. 13/023,304, filed Feb. 8, 2011.
U.S. Appl. No. 11/965,583, filed Dec. 27, 2007.

* cited by examiner

| Speed (meters/second) | | | | | | | | | |
|---|---|---|---|---|---|---|---|---|---|
| 25.00 | 1.00 | 1.00 | 1.00 | 1.00 | 1.00 | 1.00 | 1.00 | 1.00 | 1.00 |
| 22.88 | 0.88 | 1.00 | 1.00 | 1.00 | 1.00 | 1.00 | 1.00 | 1.00 | 1.00 |
| 20.75 | 0.75 | 0.86 | 0.86 | 1.00 | 1.00 | 1.00 | 1.00 | 1.00 | 1.00 |
| 18.63 | 0.63 | 0.71 | 0.71 | 0.83 | 0.83 | 1.00 | 1.00 | 1.00 | 1.00 |
| 16.50 | 0.50 | 0.57 | 0.57 | 0.67 | 0.67 | 0.80 | 0.80 | 1.00 | 1.00 |
| 14.38 | 0.38 | 0.43 | 0.43 | 0.50 | 0.50 | 0.60 | 0.60 | 0.75 | 0.75 |
| 12.25 | 0.25 | 0.29 | 0.29 | 0.33 | 0.33 | 0.40 | 0.40 | 0.50 | 0.50 |
| 10.13 | 0.13 | 0.14 | 0.14 | 0.17 | 0.17 | 0.20 | 0.20 | 0.25 | 0.25 |
| 8.00 | 0.00 | 0.00 | 0.00 | 0.00 | 0.00 | 0.00 | 0.00 | 0.00 | 0.00 |
| | 0.00 | 3.50 | 7.00 | 10.50 | 14.00 | 17.50 | 21.00 | 24.50 | 28.00 |
| | Yaw Rate (degrees/second) | | | | | | | | |

Fig. 5

SYSTEMS AND METHODS FOR DETERMINING A HEADING VALUE OF A MARINE VESSEL

CROSS-REFERENCE TO RELATED APPLICATION

This application claims the benefit of U.S. Provisional Patent Application No. 61/781,970, filed Mar. 14, 2013, which is hereby incorporated by reference in entirety.

FIELD

The present disclosure relates to marine vessels, and more particularly to systems and methods for determining a heading value of a marine vessel, which heading value can, for example, be provided to a control circuit controlling operation of the marine vessel.

BACKGROUND

U.S. Pat. No. 6,273,771, which is hereby incorporated by reference, discloses a control system for a marine vessel having a marine propulsion system than can be attached to the marine vessel and connected in signal communication with a serial communication bus and a controller. A plurality of input devices and output devices are also connected in signal communication with the communication bus.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one example disclosed herein, a method for determining a heading value of a marine vessel includes determining a first estimate of a direction of the marine vessel based on information from a first source and determining a second estimate of a direction of the marine vessel based on information from a second source. The method may also include inputting the first estimate and the second estimate to a control circuit. The control circuit scales each of the first estimate and the second estimate and adds the scaled estimates together so as to detennine the heading value.

In an additional example, a system for determining a heading value of a marine vessel includes a compass that determines a compass heading of the marine vessel, and a global positioning system receiver that calculates a course over ground of the marine vessel. A control circuit scales each of the compass heading and the course over ground and adds the scaled compass heading and course over ground together so as to determine the heading value.

BRIEF DESCRIPTION OF THE DRAWINGS

The present disclosure is described with reference to the following Figures. The same numbers are used throughout the Figures to reference like features and like components.

FIG. 5 depicts one example of a look-up table that can be used to scale an estimate of a direction of a marine vessel.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed. The different methods and systems described herein may be used alone or in combination with other methods and systems known to those of ordinary skill in the art.

Figure 1:
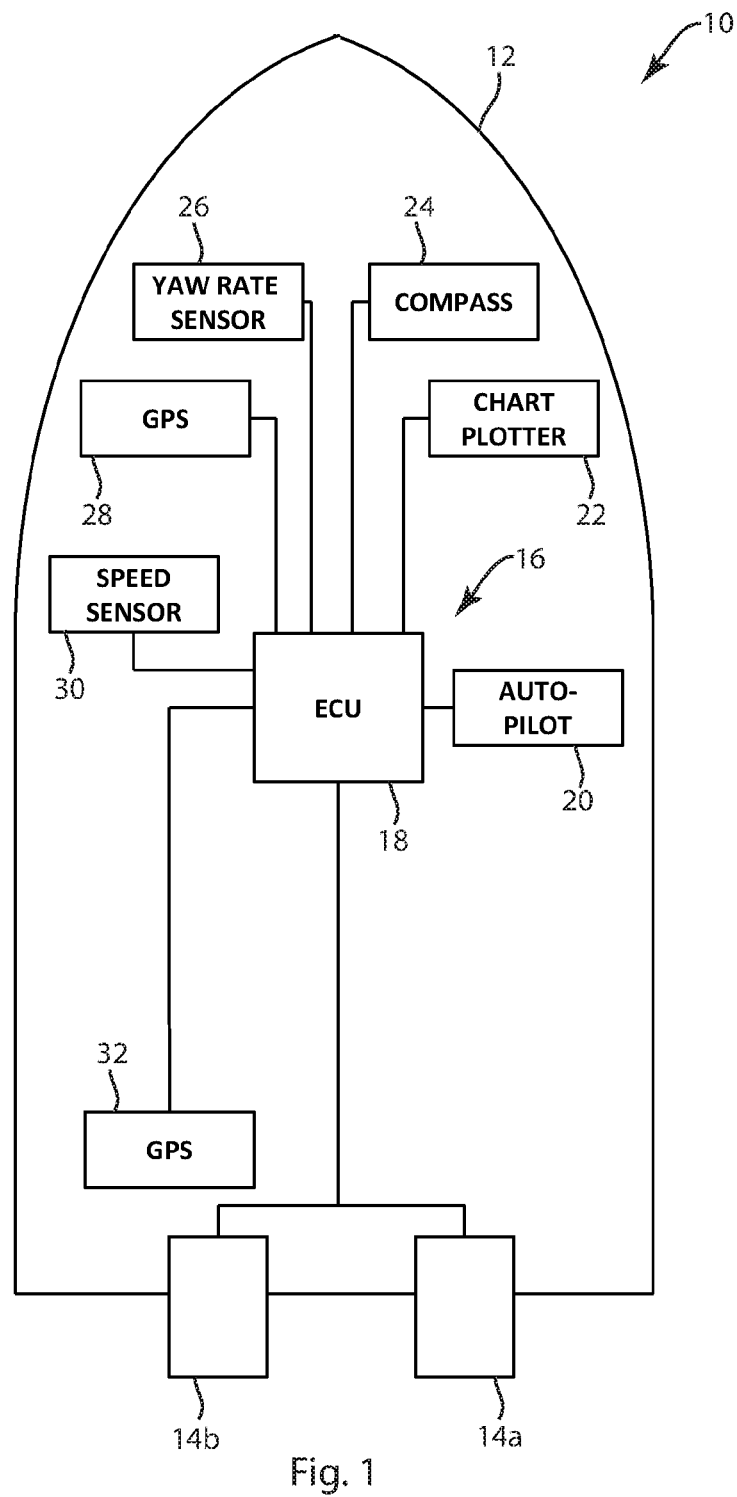
FIG. 1 is a schematic depiction of a marine vessel having a plurality of devices associated therewith.

FIG. 1 schematically depicts a system 10 for determining a heading value of a marine vessel 12. In the example shown, the marine vessel 12 includes two propulsion units 14a, 14b, although fewer or more propulsion units could be provided. The propulsion units 14a, 14b can be any type of marine propulsion unit, such as for example, pod drives, sterndrives, outboards, or jet drives. The propulsion units 14a, 14b are communicatively connected to a control circuit 16, the control circuit 16 for example comprising an electronic control unit (ECU) 18. The ECU 18 controls the direction and magnitude of thrust produced by the propulsion units 14a. 14b in order to propel the marine vessel 12 in a desired direction and at a desired speed, as will be described further herein below.

The ECU 18 may be communicatively connected to an autopilot system 20, which provides inputs to the ECU 18 to control the direction and magnitude of thrust of the propulsion units 14a, 14b with little or no continual input required from the operator of the marine vessel 12. For example, the ECU 18 may also be communicatively connected to a chart plotter 22 which may provide a series of waypoints to which the marine vessel 12 is to be guided while under the control of the autopilot system 20. Alternatively, the autopilot system 20 may allow an operator of the marine vessel 12 to select a single waypoint to which the marine vessel 12 is to be guided, or the autopilot system 20 may allow the operator of the marine vessel 12 to select a desired heading at which the marine vessel 12 is to maintain its course until otherwise directed by the operator. Each of these situations will be further described herein below.

The ECU 18 may also be communicatively connected to a compass 24, a yaw rate sensor 26, a first GPS receiver 28, and/or a speed sensor 30. The compass 24 can be, for example, a solid state compass or a flux gate compass, although a gyroscope could also be used. An optional second GPS receiver 32 may be provided on the marine vessel 12 and may be communicatively connected to the ECU 18, the purpose of which will be described herein below. In one example, the GPS receivers 28, 32 are devices such as those provided by Mercury Marine of Fond du Lac, Wis., part number 8M0046321. The GPS receiver 28 may provide the location, speed, and direction of the marine vessel 12. In a further example, the yaw rate sensor 26 and the compass 24 are provided together in an inertial measurement unit (IMU), such as that provided by Mercury Marine of Fond du Lac, Wis., part number 79-8M0048162. The IMU may have a solid state, rate gyro electronic compass that detects the direction of the earth's magnetic field using solid state magnetometers and indicates the vessel heading relative to magnetic north. Additionally, solid state accelerometers and angular rate sensors in the IMU may be provided to sense the vessel's attitude and rate of turn.

Now turning to FIG. 2, an alternative embodiment of a control circuit 16 for controlling operation of the marine vessel 12 will be described. As in FIG. 1, the control circuit 16 comprises a speed sensor 30, a GPS receiver 28, a yaw rate sensor 26, a compass 24, and a chart plotter 22. In this embodiment of the control circuit 16, however, the autopilot system 20 is provided as part of a command control module (CCM) 34a. Another command control module (CCM) 34b also comprises a portion of the control circuit 16. Each of the CCMs 34a, 34b comprises a helm control section for receiving signals sent from input devices such as the speed sensor 30, GPS receiver 28, yaw rate sensor 26, compass 24, and chart plotter 22, and processing these signals. In the example shown, each of the CCMs 34a, 34b then sends commands to respective powertrain control modules (PCMs) 36a, 36b and thrust vector modules (TVMs) 38a, 38b, which control functions of the respective propulsion units 14a, 14b of FIG. 1. For example, the PCMs 36a, 36b control the function of engines provided with the propulsion units 14a, 14b, and the TVMs 38a, 38b control trim positions and/or steering angles of the propulsion units 14a, 14b. In this way, the control circuit 16 is able to control the direction and magnitude of thrust of each of the propulsion units 14a, 14b. In the example shown in FIG. 2, although separate control modules such as the CCMs 34a, 34b; PCMs 36a, 36b; and TVMs 38a, 38b are illustrated, it should be understood that any of the control sections shown and described herein could be provided in fewer modules (such as shown in FIG. 1 by a single ECU 18) or more modules than those shown.

Any of the control modules 18, 34a, 34b, 36a, 36b, 38a. 38b may have a memory and a programmable processor. As is conventional, the processor can be communicatively connected to a computer readable medium that includes volatile or non-volatile memory upon which computer readable code (software) is stored. The processor can access the computer readable code on the computer readable medium, and upon executing the code can send signals to carry out functions according to the methods described hereinbelow. Execution of the code allows the control circuit 16 to control a series of actuators associated with the propulsion units 14a, 14b, which actuators provide the above-mentioned variance to the direction and magnitude of thrust. The processor can be implemented within a single device but can also be distributed across multiple processing devices or subsystems that cooperate in executing program instructions. Examples include general purpose central processing units, application specific processors, and logic devices, as well as any other type of processing device, combinations of processing devices, and/or variations thereof. The control circuit 16 may also obtain data from sensors aboard the vessel, including but not limited to speed sensor 30, GPS receiver 28, yaw rate sensor 26, and compass 24, and the processor may save or interpret the data as described hereinbelow. Any of the control modules may additionally comprise a memory (such as, for example, flash memory, RAM or ROM), which memory can be, for example, volatile or non-volatile, static or dynamic depending on its purpose.

Each of the devices and modules in the control circuit 16 can be communicatively connected via one or more controller area network (CAN) buses 40 (e.g. CAN buses 40a-40d), such as for example, as described in U.S. Pat. No. 6,273,771, which was incorporated by reference hereinabove. It should be understood that the connections shown in FIGS. 1 and 2 are not the only possible connections between the devices and modules, and that the wiring shown therein is merely exemplary and schematic. Fewer or more connections could be provided. It should also be understood that the devices and modules could alternatively communicate wirelessly.

Regarding functioning of the system 10, the autopilot system 20 may be engaged after an operator has manipulated the marine vessel 12 into open water and the marine vessel 12 is underway. Generally, two types of autopilot functions are provided by code stored in the autopilot system 20. The first is auto-heading, in which the operator of the marine vessel 12 may choose to automatically maintain propulsion of the marine vessel 12 at a predetermined heading. To initiate auto-heading, for example, the operator of the marine vessel 12 could select a numerical heading from a keypad or a touch screen and select the auto-heading feature of the autopilot system 20, for example via the same keypad or touchscreen. Alternatively, the operator could manipulate a steering wheel or joystick until the marine vessel 12 is oriented to a desired heading, and then select the auto-heading feature. The control circuit 16 would then maintain the marine vessel 12 at this commanded heading for an extended period of time with little or no operator input required. For example, if wind, waves, or the like push the marine vessel 12 off course, the control circuit 16 would determine the corrective action needed to return the vessel to the commanded heading, and provide steering and thrust commands to the propulsion units 14a, 14b so as to correct the direction of the marine vessel 12 such that it thereafter continues at the commanded heading.

According to a second autopilot function, the operator of the marine vessel 12 may choose to engage in waypoint tracking, during which the marine vessel 12 is automatically guided to a point (e.g., a global position defined in terms of latitude and longitude) or several points along a track. To initiate waypoint tracking mode, for example, the operator of the marine vessel 12 may select a point or track from the chart plotter 22 and select waypoint tracking mode from the autopilot system 20, for example via a keypad or touchscreen. The control circuit 16 then obtains a commanded heading from the autopilot system 20 according to the information provided by the chart plotter 22. The control circuit 16 then automatically guides the marine vessel 12 to each point along the track (or to the single selected point) by providing steering and thrust commands to the propulsion units 14a, 14b. If the marine vessel 12 veers off course, such as due to the effect of wind, waves, or the like, the control circuit 16 determines the corrective action needed to resume the commanded heading so as to guide the marine vessel 12 back to the desired point and/or track. The control circuit 16 provides steering and/or thrust commands to the propulsion units 14a, 14b to achieve such corrective action.

In both the auto-heading and waypoint tracking modes, the control circuit 16 uses a heading feedback signal (indicating an estimate of the heading at which the marine vessel 12 is actually being propelled) to determine whether correction needs to be made to the actual heading of the marine vessel 12 in order to maintain the commanded heading. The control circuit 16 uses the heading feedback signal to determine how and to what extent the propulsion units 14a, 14b must be steered (and/or with what thrust) in order to re-orient the marine vessel 12 to the commanded heading. For example, if the operator has engaged auto-heading and has selected a predetermined heading of 350 degrees, but external forces have caused the marine vessel 12 to orient itself to a heading of 345 degrees, the control circuit 16 will use a heading feedback signal of 345 degrees to perform calculations to determine to what extent the propulsion units 14a, 14b must be steered (and/or with what thrust) in order to re-orient the marine vessel 12 to a heading of 350 degrees. The control circuit 16 performs similar calculations to provide similar correction when the marine vessel 12 is operating in the waypoint tracking mode. Such automatic correction of the heading of the marine vessel 12 can be achieved according to the principles described in U.S. Pat. No. 7,268,068; U.S. Pat. No. 7,305,928; unpublished U.S. patent application Ser. No. 13/787,108; and unpublished U.S. patent application Ser. No. 11/965,583, the disclosures of which are hereby incorporated by reference in entirety.

Present systems generally use one or more of several different devices to provide a heading feedback signal to the control circuit 16, such as but not limited to: a solid state compass, a flux gate compass, a gyrocompass, a gyroscope, or two or more GPS receivers (28, 32) that compare phase data from two more individual antennas.

Generally, systems that use a compass 24 to determine the heading of the marine vessel 12 may determine the orientation of the bow of the marine vessel 12 if the compass 24 is aligned with a longitudinal axis of the marine vessel 12. The magnetic heading feedback therefore provides an estimate of the heading of the marine vessel 12. In some examples, this estimate can be corrected for magnetic variation to calculate true heading. However, systems that use a magnetic compass 24 (such as a solid state or flux gate compass) to provide the heading feedback signal to the control circuit 16 may encounter errors when the marine vessel 12 is turning. A magnetic compass 24 is subject to centripetal force, and therefore may provide a faulty reading under certain conditions, such as for example when the marine vessel 12 is turning at a high rate of turn (yaw rate), such as, for example, a yaw rate over 7 degrees/second. For example, when a marine vessel turns from a heading of east to west the magnetic compass 24 will lag behind the turn, lead ahead of the turn, or output an incorrect value. A magnetic compass 24 is also subject to errors when the compass is accelerated or decelerated as the marine vessel 12 accelerates or decelerates. Depending on which of the Earth's hemispheres the magnetic compass 24 is located in, and if the force is acceleration or deceleration, the compass 24 will increase or decrease the indicated heading.

A single GPS receiver 28 can also be used to determine a heading of the marine vessel 12. The GPS receiver 28 can determine the GPS position of the marine vessel 12 at different points in time, and by comparing these GPS positions at the different points in time can determine a course over ground (COG) of the marine vessel 12. For example, the GPS receiver 28 can note the global position of the marine vessel 12 at two different points in time. The angle between these two global positions with respect to, for example, due north represents the true course (or track) of the marine vessel 12, although it may not necessarily represent the orientation of the bow of the marine vessel 12 (as with the magnetic compass 24). Because the course over ground represents an actual course (track) of the marine vessel 12, it therefore also represents an estimate of the heading of the marine vessel 12. Course over ground readings, however, are not particularly accurate when the marine vessel 12 is traveling slowly, as the heading of the marine vessel 12 may change between the points in time at which the GPS receiver determines the GPS position of the marine vessel 12. Generally, the GPS receiver 28 can accurately calculate COG at marine vessel speeds greater than 10 mph, but COG feedback is less accurate at speeds less than 10 mph.

Through research and development, the present inventors have recognized that current systems that use a magnetic heading sensor, such as a magnetic compass 24, and/or a GPS receiver 28 for providing a heading feedback signal to an autopilot system 20 perform poorly under certain operating conditions of the marine vessel 12. The present inventors have realized that the course over ground measurement from the GPS receiver 28 provides accurate heading feedback when the marine vessel 12 is operating at high speeds and at high yaw rates, but inaccurate heading feedback when the marine vessel 12 is operating at slow speeds. In contrast, the heading feedback provided by the compass 24 provides accurate heading feedback when the marine vessel 12 is operating at low speeds and at low rates of turn, but provides inaccurate heading feedback when the marine vessel 12 is turning quickly, because of the effects of centripetal acceleration, described above. Therefore, a system that relies solely on course over ground provided by the GPS receiver 28 to provide heading feedback to the autopilot system 20 can lead to slow response, particularly while the marine vessel 12 is operating at a slow speed. A system that relies solely on the compass heading provided by the compass 24 for feedback to the autopilot system 20 results in poor performance of the autopilot system 20 during turns, especially at a high yaw rate. The present inventors have realized that it would be beneficial to prefer one or both of the compass heading sensed by the compass 24 and the course over ground provided by the GPS receiver 28 to provide a heading feedback signal to the autopilot system 20. This way, accurate heading feedback can be obtained both at low vessel speeds and low yaw rate, and high vessel speeds and high yaw rate. Systems and methods for providing this heading feedback, hereinafter referred to as a "heading value," will be described further herein below.

Figure 2:
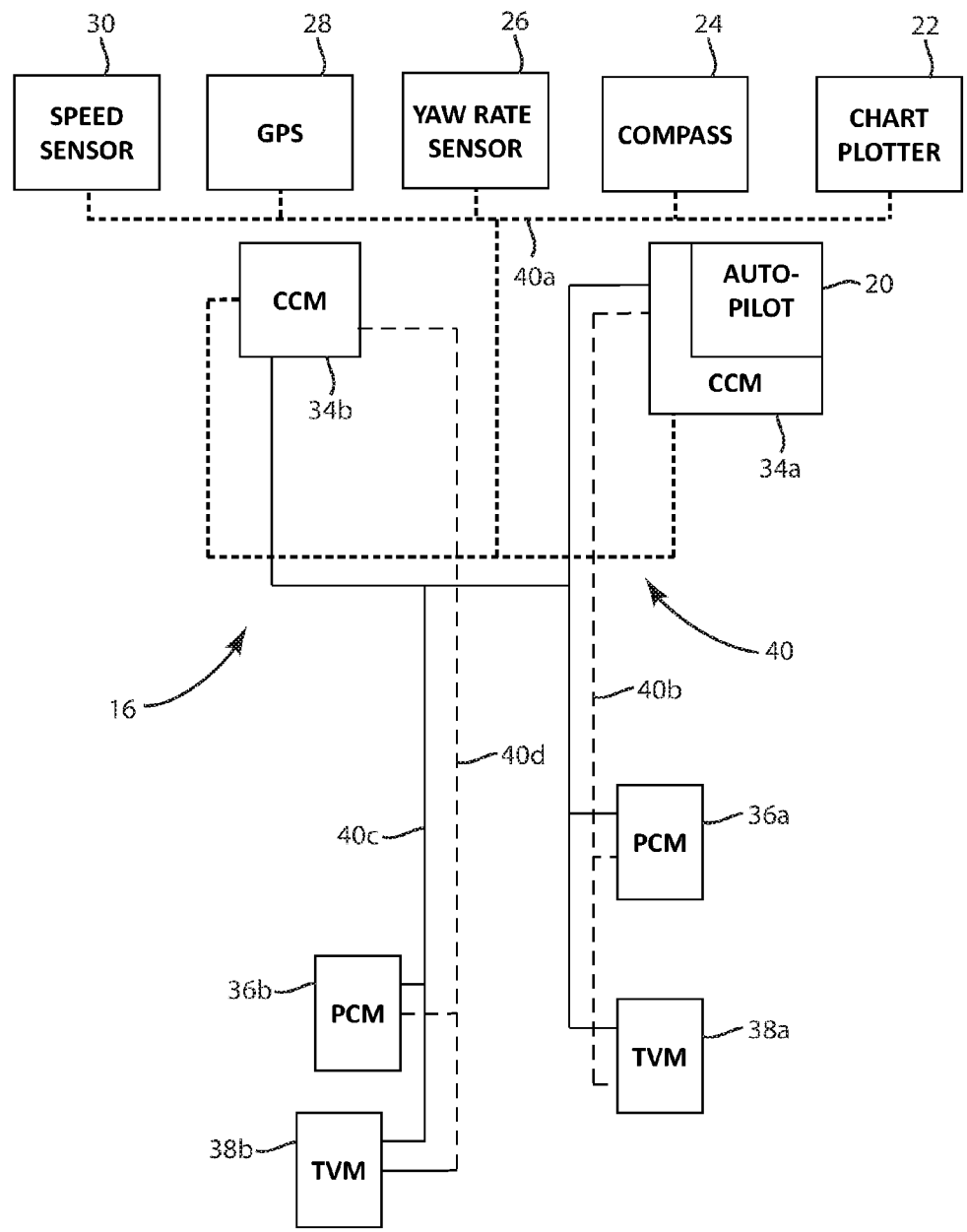
FIG. 2 is a schematic depiction of a control circuit for controlling operation of a marine vessel.

Referring to both FIGS. 1 and 2, a system 10 for determining a heading value of a marine vessel 12 includes a compass 24 that determines a compass heading of the marine vessel 12. In one example, the compass 24 is a magnetic compass. The system 10 further comprises a global positioning system receiver 28 that calculates a course over ground of the marine vessel 12. The system 10 includes a control circuit 16 that scales each of the compass heading and the course over ground and adds the scaled compass heading and course over ground together so as to determine the heading value. The system 10 also includes a speed sensor 30 that determines a speed of the marine vessel 12 and a yaw rate sensor 26 that determines the yaw rate of the marine vessel 12. The control circuit 16 determines a first coefficient by which to scale the compass heading and a second coefficient by which to scale the course over ground based upon the speed and the yaw rate. In one example, the first coefficient is different than the second coefficient. For example, the second coefficient is greater than the first coefficient when the marine vessel 12 is operating at a high speed and a high yaw rate. The first coefficient is greater than the second coefficient when the marine vessel 12 is operating at a low speed and a low yaw rate. As will be described further hereinbelow, the control circuit 16 sets one of the compass heading and the course over ground as the heading value when the first estimate differs from the second estimate by more than a threshold. The system 10 also comprises an autopilot system 20 communicatively connected to the control circuit 16. The control circuit 16 provides the heading value to the autopilot system 20.

Figure 3:
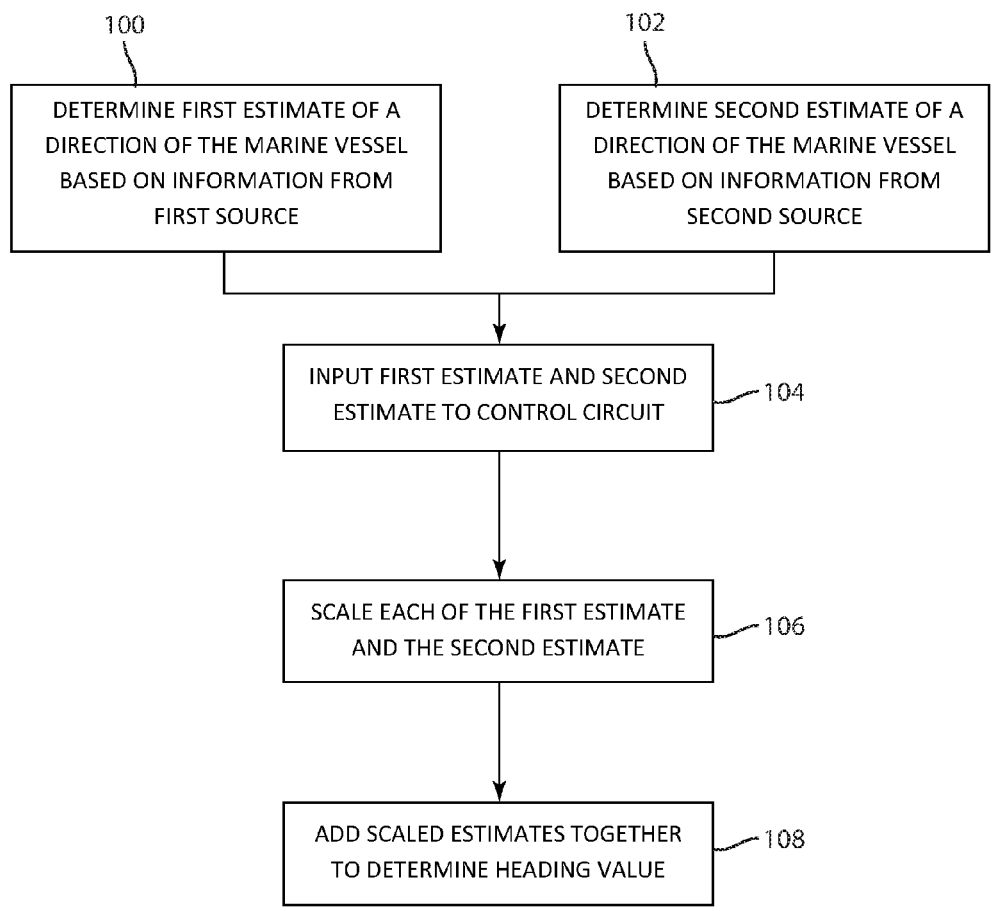
FIG. 3 is a flow chart depicting one example of a method for determining a heading value of a marine vessel.

With reference to FIG. 3, software stored within the system 10 (for example stored in a memory of one of the control modules 18, 34, 36, or 38) carries out one example of a method for determining the heading value of the marine vessel 12. As shown at 100, the method includes determining a first estimate of a direction of the marine vessel 12 based on information from a first source. In one example, the first source is a magnetic compass 24 and the first estimate is a compass heading of the marine vessel 12. As shown at 102, the method includes determining a second estimate of a direction of the marine vessel 12 based on information from a second source. In one example, the second source is a global positioning system receiver 28 and the second estimate is a course over ground of the marine vessel 12. As shown at 104, the method further includes inputting the first estimate and the second estimate to a control circuit 16. The control circuit 16 scales each of the first estimate and the second estimate according to software stored therein, as shown at 106, and adds the scaled estimates together so as to determine the heading value, as shown at 108.

Now with reference to FIG. 4, a further example method for determining a heading value of the marine vessel 12 will be described. As disclosed hereinabove, a compass 24 provides a compass heading and a GPS receiver 28 provides a course over ground (COG) to a logic circuit 41 which comprises a portion of control circuit 16. Each of the compass heading and the course over ground, for example, is a value between 0 and 360 degrees. The compass heading and the course over ground represent first and second estimates, respectively, of a direction of the marine vessel 12. The first and second estimates (compass heading and course over ground, respectively) are provided to a difference calculator 42. The difference calculator 42 calculates a difference between the compass heading and the course over ground and provides this difference to a comparator 44. The comparator 44 makes a determination as to whether the difference between the first estimate (e.g. compass heading) and second estimate (e.g. COG), calculated by the difference calculator 42 is greater than a threshold. The comparator 44 provides this information to a heading value calculator 48, which will be described further herein below Meanwhile, a speed sensor 30 and a yaw rate sensor 26 provide a speed and yaw rate, respectively, to a look-up table 46. In another example, the speed and yaw rate of the marine vessel 12 are values calculated from other sensors aboard the marine vessel 12. The look-up table 46 allows the control circuit 16 to determine a first coefficient by which to scale the first estimate (compass heading) and a second coefficient by which to scale the second estimate (COG) based upon the speed and the yaw rate of the marine vessel 12. One example of a look-up table 46 is provided in FIG. 5. It should be understood that the look-up table 46 of FIG. 5 is merely exemplary and that the table could contain values other than those shown herein. Further, it should be understood that a look-up table is not the only way to determine the first and second coefficients by which to scale the first and second estimates, and that other models and/or equations could be provided within the software of the control circuit 16 for determining such coefficients.

Figure 4:
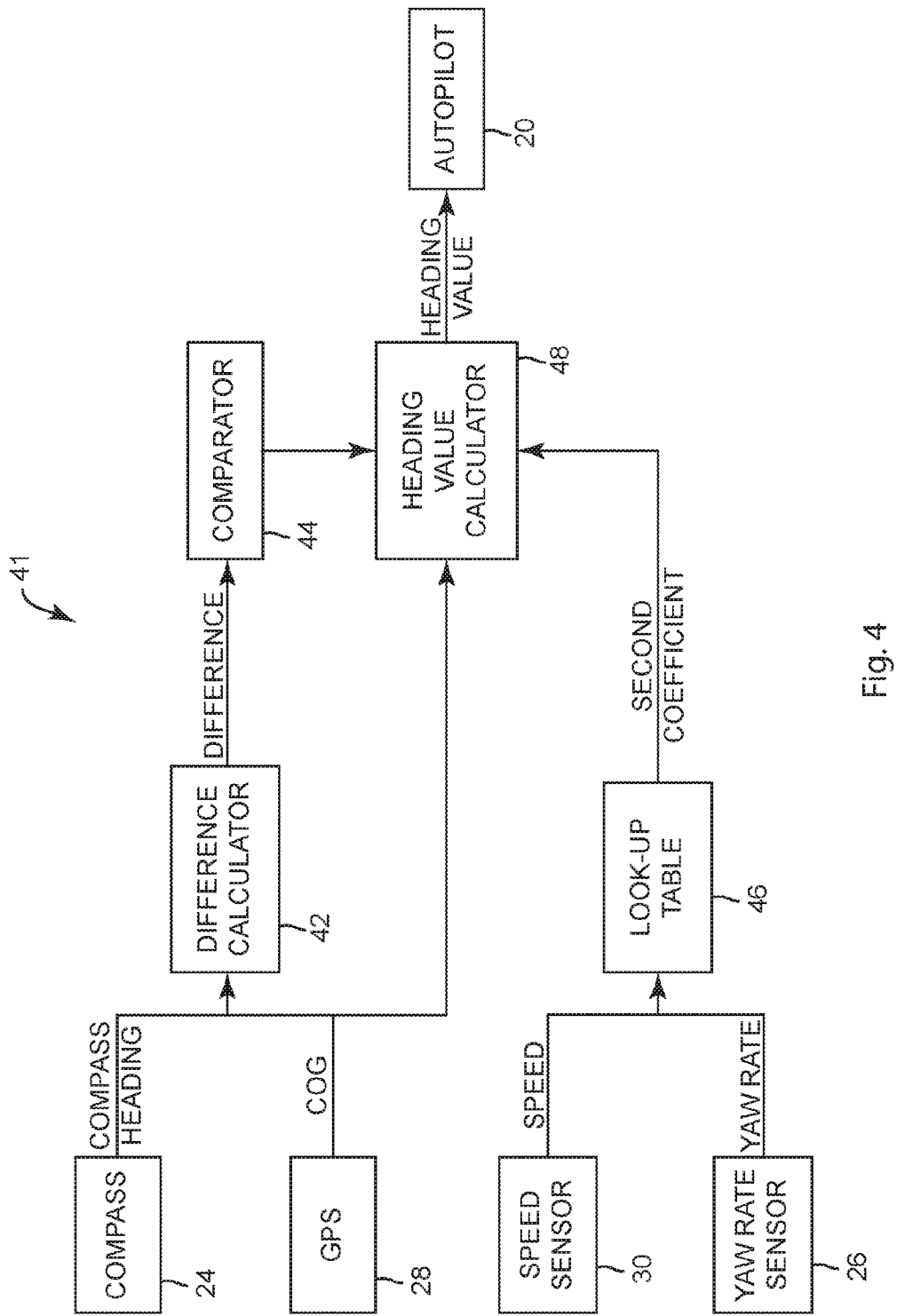
FIG. 4 is a schematic depicting a logic circuit that can be used to determine a heading value of a marine vessel.

In the example of FIG. 4, the speed and the yaw rate are input into the look-up table 46 to determine the second coefficient. For example, as shown in FIG. 5, when the yaw rate on the vertical axis is 7 degrees/second and the vessel speed on the horizontal axis is 18.63 meters/second, the look-up table 46 provides a second coefficient of 0.71. This second coefficient is then provided to the heading value calculator 48 (see FIG. 4). The heading value calculator 48 uses the determination made by the comparator 44 as to whether the difference between the first estimate (e.g. compass heading) and second estimate (e.g. COG) is greater than the threshold, and also uses the second coefficient provided by the look-up table 46 in order to calculate a heading value. The heading value calculator 48 then provides this heading value to the autopilot system 20.

According to the present method carried out by the heading value calculator 48, the control circuit 16 sets one of the first estimate (e.g. compass heading) and the second estimate (e.g. COG) as the heading value when the first estimate differs from the second estimate by more than the threshold, as determined by the comparator 44. For example, the control circuit 16 sets the heading value equal to the first estimate (e.g. compass heading) when the first estimate differs from the second estimate by more than the threshold and the marine vessel 12 is operating at a low speed and a low yaw rate. This is because at low speed and low yaw rate, the compass heading is an accurate estimate of the heading of the marine vessel 12, as there is little centripetal acceleration at low speeds. Alternatively, the control circuit 16 sets the heading value equal to the second estimate (e.g. COG) when the first estimate differs from the second estimate by more than the threshold and the marine vessel 12 is operating at a high speed and a high yaw rate. This is because the course over ground is a more accurate estimate of the heading of the marine vessel 12 at high speed and high yaw rate. The control circuit 16 may set the heading value equal to one of the first estimate and the second estimate according to a rounding function, described further herein below.

It should be understood that the compass heading and COG are used here for exemplary purposes only, and that the control circuit 16 can be programmed to prefer a reading from any one of the devices listed above for providing a heading feedback signal, including but not limited to a gyrocompass, a gyroscope, or two or more GPS devices, depending on the desired accuracy of the heading feedback signal under varied conditions. Further, it should be understood that the control circuit 16 may be programmed, for example, such that the compass heading feedback signal is preferred when the marine vessel 12 is operating at a high speed and a low yaw rate; such that the compass heading feedback signal is preferred when the marine vessel 12 is operating at low speed, no matter what the yaw rate; or such that the COG heading feedback signal is preferred when the marine vessel 12 is operating at a high speed, no matter what the yaw rate. Generally, however, the trend of favoring the compass heading at low speeds and low yaw rates and favoring the COG heading at high speeds and high yaw rates will result in accurate heading feedback readings for use by the autopilot system 20.

Returning to the comparison made by the comparator 44, if in contrast, the comparator 44 determines that the difference output by the difference calculator 42 is not greater than the threshold, the heading value calculator 48 blends the first and second estimates of the direction of the marine vessel 12, for example by blending heading estimates from both the compass 24 and the GPS receiver 28. The heading value calculator 48 uses scaled values of each of the first and second estimates (e.g. compass heading and COG) and adds these scaled values together to obtain a weighted average of the two values, which weighted average is output as the heading value to the autopilot system 20. The heading value calculator 48 achieves such scaling by utilizing the first and second coefficients referred to hereinabove. The heading value calculator 48 calculates the heading value according to the following equation:

$$\text{heading value} = (\text{first\_estimate} * \text{first\_coefficient}) + (\text{second\_estimate} * \text{second\_coefficient})$$

Or, using the exemplary feedback signals:

$$\text{heading value} = (\text{compass\_heading} * \text{first\_coefficient}) + (\text{COG} * \text{second\_coefficient})$$

As described above, the second coefficient is determined by inputting the speed and the yaw rate into the look-up table 46. The first coefficient may be calculated according to the following equation:

$$\text{first\_coefficient} = 1 - \text{second\_coefficient}$$

In the example given above, the second coefficient from the look-up table 46 of FIG. 5 was 0.71. Assuming a compass heading of 300 degrees and a course over ground of 307 degrees, and also assuming that the comparator 44 has determined that the difference between the two estimates (here, 307−300=7 degrees) is less than the threshold, the heading value calculator 48 would perform the following calculations:

second_coefficient=0.71 first_coefficient=1−0.71=0.29 heading value=(300*0.29)+(307*0.71)=~305

If the difference between the two estimates were instead greater than the threshold, the heading value calculator 48 would not blend the two estimates, but would instead round the value from the look-up table 46 down or up to the nearest whole number, effectively returning either the compass heading or the COG as the heading value. For example, assume a threshold of 30 degrees, a compass heading of 300 degrees, a course over ground of 333 degrees, a yaw rate of 7 degrees/second, and a vessel speed of 18.63 m/s. The heading value calculator 48 receives an indication from the comparator 44 that the difference (here, 333−300=33 degrees) is greater than the threshold (here, 30 degrees). Therefore, the heading value calculator 48 rounds the second coefficient determined from the look-up table 46 to the nearest whole number. Here, 0.71 (at 7 degrees/second and 18.63 m/s) rounds up to the nearest whole number of 1.0. The heading value calculator 48 therefore performs the following calculation:

second_coefficient=1 first_coefficient=1−1=0 heading value=(300*0)+(333*1)=333

Therefore, it can be seen that when the first estimate differs from the second estimate by more than the threshold and the marine vessel 12 is operating at a high speed and a high yaw rate, the heading value calculator 48 sets the heading value equal to the course over ground measurement provided by the GPS receiver 28. In other words, the control circuit 16 sets the heading value equal to the second estimate when the first estimate differs from the second estimate by more than the threshold and the marine vessel 12 is operating a high speed and a high yaw rate In contrast, assume a threshold of 30 degrees, a compass heading of 300 degrees, a course over ground of 333 degrees, a yaw rate of 3.50 degrees/second, and a vessel speed of 10.13 m/s. The heading value calculator 48 receives an indication from the comparator 44 that the difference (here, 333−300=33 degrees) is greater than the threshold (here, 30 degrees). Therefore, the heading value calculator 48 rounds the second coefficient determined from the look-up table 46 to the nearest whole number. Here, 0.14 (at 3.50 degrees/second and 10.13 m/s) rounds down to the nearest whole number of 0.0. The heading value calculator 48 therefore performs the following calculation:

second_coefficient=0 first_coefficient=1−0=1 heading value=(300*1)+(333*0)=300

Therefore, it can be seen that when the first estimate differs from the second estimate by more than the threshold and the marine vessel 12 is operating at a low speed and a low yaw rate, the heading value calculator 48 sets the heading value equal to the compass heading measurement provided by the compass 24. In other words, the control circuit 16 sets the heading value equal to the first estimate when the first estimate differs from the second estimate by more than the threshold and the marine vessel 12 is operating at a low speed and a low yaw rate.

It should be understood that the look-up table 46 may instead provide the first coefficient and the second coefficient may be calculated therefrom in another example of the present disclosure. Additionally, while here a coefficient of "1" from the look-up table 46 favors using the course over ground and a coefficient of "0" favors using the compass heading, in other examples, a coefficient of "1" could favor using the compass heading and "0" the course over ground. In other examples, the coefficients may not be rounded if the difference between the two estimates exceeds a threshold. In other examples, the coefficients may be rounded if the difference exceeds the threshold, but may not be rounded to the nearest whole number (i.e., 0 or 1) but instead to different values. Further, the coefficients may be determined from separate look-up tables or according to other equations stored in the memory of the control circuit 16. The coefficients may be generated by testing and calibration of the system under various conditions, as the speed and yaw rate of the test marine vessel are varied and heading feedback signals are evaluated for accuracy.

The system 10 may also be provided with the ability to hold the first and second coefficients at their previously-determined values as long as the difference between the compass heading and the course over ground determined by the difference calculator 42 is greater than the threshold. The first and second coefficients will remain the same until the difference calculated by the difference calculator 42 drops below the threshold as determined by the comparator 44. This minimizes step changes in the calculated heading value if the difference between the compass heading the course over ground is great, but the values of the coefficients transition across 0.5 (the cut-off for rounding up to 1.0 versus rounding down to 0.0) due to changes in vessel speed and/or yaw rate.

The present disclosure thereby allows the system 10 to switch between providing to the autopilot system 20 one of the following: (1) a heading value that is equal to a compass heading, (2) a heading value that is equal to a course over ground, or (3) a heading value that is a blend of the compass heading and the course over ground, depending on the speed of the marine vessel 12 and the vessel's yaw rate. Whichever reading (from compass 24 or GPS receiver 28) constitutes more accurate heading feedback at a certain speed and yaw rate is either weighted more heavily during calculation of the heading value or selected as the heading value itself. Such a system and method allow the autopilot system 20 to be provided with a heading value that does not vary dramatically based on the speed of the vessel and/or its yaw rate. This leads to an increase in consistency of the heading value provided to the autopilot system 20, and increased control over the marine vessel 12 by the autopilot system 20 as a result of more accurate correction of the heading of the marine vessel 12 by automatic positioning of the propulsion units 14a, 14b. This also extends the usable range of the autopilot system 20 to include higher speed ranges than possible using just a magnetic compass.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims. Each limitation in the appended claims is intended to invoke interpretation under 35 U.S.C. §112(f), only if the terms "means for" or "step for" are explicitly recited in the respective limitation.

What is claimed is:

1. A method for determining a heading value of a marine vessel, the method comprising:
   determining a speed of the marine vessel;
   determining a first estimate of a direction of the marine vessel based on information from a first source that detects the direction of the marine vessel with respect to Earth's magnetic field;
   determining a second estimate of the direction of the marine vessel based on information from a second source that detects the direction of the marine vessel based on a vessel course over ground; and
   inputting the speed, the first estimate, and the second estimate to a control circuit;
   wherein the control circuit scales each of the first estimate and the second estimate and sums the scaled first estimate and the scaled second estimate together so as to determine the heading value;
   wherein the control circuit weights the first estimate more heavily than the second estimate when the marine vessel is operating at a low speed, and weights the second estimate more heavily than the first estimate when the marine vessel is operating at a high speed; and
   wherein the control circuit provides the heading value to a heading control section, which compares the heading value to a commanded heading in order to determine a corrective steering action and output a corrective steering command and orient the marine vessel at the commanded heading based on the corrective steering command.

2. The method of claim 1, further comprising:
   determining a yaw rate of the marine vessel; and
   inputting the yaw rate to the control circuit;
   wherein the control circuit determines a first coefficient by which to scale the first estimate based upon the speed and the yaw rate and a second coefficient by which to scale the second estimate based upon the speed and the yaw rate.

3. The method of claim 2, wherein the control circuit inputs the speed and the yaw rate into a look-up table to determine the second coefficient.

4. The method of claim 3, wherein the control circuit determines the first coefficient according to the following equation:

first_coefficient=1−second_coefficient.

5. The method of claim 2, wherein the second coefficient is greater than the first coefficient when the marine vessel is operating at a high speed and a high yaw rate.

6. The method of claim 5, wherein the first coefficient is greater than the second coefficient when the marine vessel is operating at a low speed and a low yaw rate.

7. The method of claim 6, wherein the control circuit sets one of the first estimate and the second estimate as the heading value when the first estimate differs from the second estimate by more than a threshold.

8. The method of claim 7, wherein the control circuit sets the heading value equal to the first estimate when the first estimate differs from the second estimate by more than the threshold and the marine vessel is operating at a low speed and a low yaw rate.

9. The method of claim 7, wherein the control circuit sets the heading value equal to the second estimate when the first estimate differs from the second estimate by more than the threshold and the marine vessel is operating at a high speed and a high yaw rate.

10. The method of claim 1, wherein the first source is a magnetic compass and the first estimate is a compass heading of the marine vessel.

11. The method of claim 10, wherein the second source is a global positioning system receiver and the second estimate is the vessel course over ground.

12. A system for determining a heading value of a marine vessel, the system comprising:
    a speed sensor that determines a speed of the marine vessel;
    a compass that determines a compass heading of the marine vessel;
    a global positioning system receiver that calculates a course over ground of the marine vessel;
    an autopilot system that one of receives and determines a commanded heading of the marine vessel; and
    a control circuit that scales each of the compass heading and the course over ground and sums the scaled compass heading and the scaled course over ground together so as to determine the heading value;
    wherein the control circuit weights the compass heading more heavily than the course over ground when the marine vessel is operating at a low speed and weights the course over ground more heavily than the compass heading when the marine vessel is operating at a high speed;
    wherein the control circuit compares the heading value to the commanded heading in order to determine a corrective steering action and output a corrective steering command and orient the marine vessel at the commanded heading based on the corrective steering command.

13. The system of claim 12, further comprising:
    a yaw rate sensor that determines a yaw rate of the marine vessel;
    wherein the control circuit determines a first coefficient by which to scale the compass heading based upon the speed and the yaw rate and a second coefficient by which to scale the course over ground based upon the speed and the yaw rate.

14. The system of claim 13, wherein the first coefficient is different than the second coefficient.

15. The system of claim 14, wherein the second coefficient is greater than the first coefficient when the marine vessel is operating at a high speed and a high yaw rate.

16. The system of claim 15, wherein the first coefficient is greater than the second coefficient when the marine vessel is operating at a low speed and a low yaw rate.

17. The system of claim 16, wherein the control circuit sets one of the compass heading and the course over ground as the heading value when the compass heading differs from the course over ground by more than a threshold.

18. The system of claim 12, wherein the compass is a magnetic compass.

* * * * *